United States Patent
Krampl et al.

(10) Patent No.: US 11,539,436 B2
(45) Date of Patent: Dec. 27, 2022

(54) CABLE MODEM SYSTEM MANAGEMENT OF PASSIVE OPTICAL NETWORKS (PONS)

(71) Applicant: Intel Corporation, Santa Clara, CA (US)

(72) Inventors: Gerfried Krampl, Villach (AT); Barak Hermesh, Pardes Hana (IL); Amos Klimker, Jerusalem (IL); Shaul Shulman, Ramat Gan (IL); Franz-Josef Schaefer, Oberhaching (AT); Guy Ray, Kiryat Ono (IL)

(73) Assignee: MaxLinear, Inc., Carlsbad, CA (US)

( * ) Notice: Subject to any disclaimer, the term of this patent is extended or adjusted under 35 U.S.C. 154(b) by 211 days.

(21) Appl. No.: 16/631,578

(22) PCT Filed: Jan. 11, 2018

(86) PCT No.: PCT/US2018/013306
§ 371 (c)(1),
(2) Date: Jan. 16, 2020

(87) PCT Pub. No.: WO2019/036060
PCT Pub. Date: Feb. 21, 2019

(65) Prior Publication Data
US 2020/0204257 A1 Jun. 25, 2020

Related U.S. Application Data

(60) Provisional application No. 62/547,537, filed on Aug. 18, 2017.

(51) Int. Cl.
*H04J 14/00* (2006.01)
*H04B 10/25* (2013.01)
(Continued)

(52) U.S. Cl.
CPC ............ *H04B 10/25* (2013.01); *H04B 10/27* (2013.01); *H04B 10/40* (2013.01); *H04L 63/0428* (2013.01)

(58) Field of Classification Search
CPC ........ H04B 10/27; H04B 10/25; H04B 10/40; H04B 10/2575; H04B 10/25751;
(Continued)

(56) References Cited

U.S. PATENT DOCUMENTS

| | | | |
|---|---|---|---|
| 8,160,448 B2 * | 4/2012 | Tsuge | H04L 41/0226 398/58 |
| 8,831,425 B1 * | 9/2014 | Bernstein | H04B 10/27 398/70 |

(Continued)

OTHER PUBLICATIONS

International Search Report dated Aug. 5, 2018 for International Application PCT/US2018/013306.
(Continued)

*Primary Examiner* — Hanh Phan
(74) *Attorney, Agent, or Firm* — Buchalter; Jason W. Croft (57) ABSTRACT

A network infrastructure combining data over cable service interface specification (DOCSIS) cable modem management and 10 Gb passive optical network XGPON networking technology. The DOCSIS equipment controls restrict the XGPON to physical layer (layer 1) while the DOCSIS equipment operate at a data link layer and above.

21 Claims, 6 Drawing Sheets

(51) Int. Cl.
*H04B 10/27* (2013.01)
*H04B 10/40* (2013.01)
*H04L 9/40* (2022.01)

(58) Field of Classification Search
CPC ......... H04B 10/25753; H04Q 11/0067; H04Q 11/0062; H04L 12/2898; H04L 12/2801; H04L 12/2885
USPC ........ 398/66, 67, 68, 69, 70, 71, 72, 79, 98, 398/99, 100, 135, 136, 158, 159, 115; 370/352, 392, 389, 468, 465; 725/111, 725/129, 127, 125
See application file for complete search history.

(56) References Cited

U.S. PATENT DOCUMENTS

| | | | |
|---|---|---|---|
| 9,479,118 B2 | 10/2016 | Khlat et al. | |
| 9,516,693 B2 | 12/2016 | Khlat et al. | |
| 9,595,981 B2 | 3/2017 | Khlat et al. | |
| 2008/0232801 A1 | 9/2008 | Arnold et al. | |
| 2013/0183037 A1* | 7/2013 | Bronstein | H04L 41/046 398/66 |
| 2014/0248054 A1* | 9/2014 | Wu | H04L 12/413 398/66 |
| 2014/0334822 A1* | 11/2014 | Hajduczenia | H04Q 11/0067 398/58 |
| 2015/0155834 A1 | 6/2015 | Ripley et al. | |
| 2015/0263817 A1* | 9/2015 | Pantelias | H04J 3/16 370/395.41 |
| 2016/0087590 A1 | 3/2016 | Menegoli et al. | |
| 2017/0195972 A1 | 7/2017 | Drogi et al. | |

OTHER PUBLICATIONS

DOCSIS Provisioning of GPON Specifications DPoGv1.0, 2014, p. 1-20.
DOCSIS Provisioning of GPON Specification DPoGv1.0; DPoG MAC and Upper Layer Protocols Interface Specification, 2014, p. 1-98.
"Envelope Tracking for Cellular RF Power Amplifiers." Envelope Tracking for Cellular RF Power Amplifiers, PowerGuru—Power Electronics Information Portal. Jan. 5, 2018. 5 pages.
"Envelop Tracking Circuit Block Diagram Envelope tracking circuit blocks enable the envelope shape to be detected and then applied to a high efficiency power supply to enable exactly the right voltage to be applied to the RF power amplifier." Envelope Tracking Circuit Block Diagram, Electronics Notes. Jan. 5, 2018. 10 pages.
"What is RF Amplifier Envelope Tracking: A Primer RF amplifier envelope tracking is an innovative technique to improve the efficiency of RF power amplifiers—it is widely used in smartphones and other applications where amplifier efficiency is key." What is RF Envelope Tracking—A Primer, Electronic Notes. Dec. 29, 2017. 14 pages.
"RF Front End Interface (RFFE)." mipi alliance technology brief. www.mipi.org. 3 pages, 2016.
International Preliminary Report on Patentability dated Feb. 18, 2020 for International Application PCT/US2018/013306.

* cited by examiner

CABLE MODEM SYSTEM MANAGEMENT OF PASSIVE OPTICAL NETWORKS (PONS)

CROSS-REFERENCE TO RELATED APPLICATIONS

This application is a National Phase entry application of International Patent Application No. PCT/US2018/013306 filed Jan. 11, 2018, which claims priority to priority under 35 U.S.C. § 119(e) to U.S. Patent Application Ser. No. 62/547,537 filed Aug. 18, 2017, by the same inventors and title as the present application, and is hereby incorporated by reference in their entirety.

FIELD

Embodiments of the present invention relate generally to, but are not limited to, communication architectures and methods for communications using cable modem network management features to manage passive optical networks (PONs).

BACKGROUND

Data Over Cable Service Interface Specifications (DOCSIS) is a standard series used to provide Internet to cable subscribers. A DOCSIS 3.1 cable modem (CM) is a client-side end point in a point-to-multipoint cable network which provides IP connectivity to one or more customer premises equipment (CPE) attached, e.g., via the CM having a service connection to broadband Internet over a medium such as coaxial cable, fiber or hybrid fiber coax (HFC).

Passive optical networks (PONs), Ethernet PON (EPON), gigabit EPON (GEPON), 10G-EPON (XEPON), gigabit capable PON (GPON), next generation PON (NG-PON) and many other derivatives, generically referred to herein as "PON" or "XGPON" are a telecommunications technology used to provide connectivity over optical fiber to the end consumer. The PON having the a similar characteristic of implementing a point-to-multipoint architecture, although with un-powered or "passive" fiber, optic splitters, passive filters, etc., enabling an ISP to use a single fiber to deliver "last-mile" connectivity to a plurality of customers. A PON consists of an optical line terminal (OLT) at the ISP hub or headend, and a plurality of optical network units (ONUs) or optical network terminals (ONTs) near or at end users location. The fibers and splitters between the OLT and ONUs are called the optical distribution network (ODN). The specifics of PONs and their variations are governed by a series of European ITU-T Series "G" Specifications such as: G.652.x, G.983.x, 984.x, G.987.x, G.9807.x, G.989 and/or their equivalents in other countries. For example, Ethernet PONs (EPONs), ATM PONs (APONs), Broadband PONs (BPONs), Gigabit-capable PONs (GPONs), etc.

Because early versions of DOCSIS already detailed an interface and management protocols for cable networks, providing subscriber data access using coax or hybrid coax-fiber point to multi-point networking protocols and features, early passive optical networks (PONs) with point to multi-point topologies were adapted to use DOCSIS as a management plane. For example, DOCSIS provisioning over Ethernet PONs (DPoE), which implemented the DOCSIS operations administration maintenance and provisioning (OAMP) functionality on EPON equipment for providing IP network packet access to cable customers. Essentially, DPoE made the EPON OLT look and act like a DOCSIS cable modem termination system (CMTS) platform with IP service capabilities.

10 Gb-PON, and later standards efforts, based on ITU specifications: XG-PON (G.987), XGSPON (G.9807), NG-PON2 (G.989) and future derivatives (25 Gb, 40 Gb, 100 Gb) and their IEEE equivalents, were and are developed with their own specific network management requirements and protocols. Therefore, implementing DPoE on newer XGPONs would require substantial differentiation and adaptation of both the cable and optical network specifications. This would be undesirable imposing a large impact on existing equipment and software for both cable and optical specification. Therefore, an improved method or architecture for providing cable modem subscribers with the speed and bandwidth advantages of passive optical network architectures would be desirable.

BRIEF DESCRIPTION OF THE DRAWING FIGURES

Certain circuits, logic operation, apparatuses and/or methods will be described by way of non-limiting example only, in reference to the appended Drawing Figures in which.

DETAILED DESCRIPTION OF THE INVENTION

While reference to example embodiments of the invention may be made to cable modem data networks, such as defined by DOCSIS® by Cable Television Laboratories, Inc. and Gigabit capable passive optical networks as specified by the ITU-G series of standards, the inventive embodiments are not limited thereto and may use any protocols, applications or architectures where similar principles may be applied and their use provides similar advantages. Thus the specific description herein is provided only in context of example embodiments and are not limited thereto.

Definitions

Due to a large variety of referenced elements, abbreviations, and items specific to either the DOCSIS cable or ITU-based XGPON networking specifications, a list of relevant definitions for describing aspects of various example embodiments of the invention is provided below. The immediate following definitions are reproduced from the DOCSIS 3.(x) for MAC and Upper Layer Protocols Interface Specification, CM-SP-MULPIv3.1-l04-141218, which is incorporated herein by its reference:

Bandwidth Allocation Map: The MAC Management Message that the CMTS uses to allocate transmission opportunities to CMs.

Cable Modem (CM): A modulator-demodulator at subscriber locations intended for use in conveying data communications on a cable television system.

Cable Modem Termination System (CMTS): A network node, located at a cable operator's head-end or distribution hub which provides complementary functionality to the cable modems to enable data connectivity to a wide-area network. A CMTS is considered to be a DOCSIS network element that forwards packets between one or more Network Side Interface (NSI) ports (defined in [DOCSIS NSI]) and DOCSIS RF Interface (RFI) ports.

Network Layer: Layer 3 in the Open Systems Interconnection (OSI) architecture; the layer that provides services to establish a path between open systems.

Data Link Layer: Layer 2 in the Open System Interconnection (OSI) architecture; the layer that provides services to transfer data over the transmission link between open systems. For example, the Logical Link Control (LLC) is an upper L2 sublayer and media access control (MAC) is a lower L2 sublayer, both LLC and MAC together comprise the data link layer.

Physical Layer: Layer 1 in the Open System Interconnection (OSI) architecture; the layer that provides services to transmit bits or groups of bits over a transmission link between open systems and which entails electrical, mechanical and handshaking procedures.

Service Flow: A MAC layer transport service which provides unidirectional transport of packets from the upper layer service entity to the RF and shapes, polices, and prioritizes traffic according to QoS traffic parameters defined for the Flow.

Service Flow Identifier: An identifier assigned to a service flow by the CMTS.

Service Group (SG): is formally defined as the complete set of upstream and downstream channels that can provide service to a single subscriber device. This includes channels from different DOCSIS MAC Domains and even different CMTSs as well as video EQAMs.

Service Identifier (SID): A Service Flow Identifier assigned by the CMTS (in addition to a Service Flow Identifier) to an Active or Admitted Upstream Service Flow.

MAC Management Message (MMM): A variety of predefined control messages used by a CMTS to ensure all modems served by a single CMTS act in a fair and reasonable manner. Such management is for timing synchronization, channel and bandwidth designations and a variety of ranging, registration, dynamic service requests and responses and acknowledgements.

Network-Side Interface (NSI): The data interface of a CMTS at the headend (or hub) of a data-over-cable system which interfaces (not including switches or routers in the headend) the upstream and downstream IP traffic flows between a DOCSIS CMTS and an ISPs IP network.

Protocol Data Unit (PDU): A message or data element which may be understood by protocols of the same open systems interconnection (OSI) layer. Each protocol layer (and sublayers) of the OSI model creates a PDU for transmission including headers understood or readable by that layer protocol, and data or information to be transmitted (i.e., a payload). This data becomes the service data unit (SDU) of the next OSI layer below it. E.g., a layer 7 PDU, having a header and application data, becomes a layer 6 SDU. Layer 6 protocol prepends a layer 6 header to it, which is passed to layer 5 as a layer 5 SDU and the "encapsulation" process continues all the way down to layer 2, which creates a layer 2 PDU by encapsulating with a layer 2 header (and sometimes a footer), which is converted to bits and sent over a transmission medium at layer 1, i.e., the PHY layer. The DOCSIS MAC frame or PDU, includes a MAC header and, optionally, a data payload, in the form of variable length packets or PDU fragmentations. The format of DOCSIS MAC PDUs is the same as is used in Ethernet, e.g., IEEE 802.3.

DOCSIS MAC Domain: is a logical sub-component of a CMTS that is responsible for implementing all DOCSIS functions on a set of downstream channels and upstream channels. A CMTS MAC Domain contains at least one downstream channel and at least one upstream channel. A MAC Domain is responsible for sending and receiving all MAC Management Messages (MMMs) to and from a set of CMs that are registered on that MAC Domain. A CM is registered to only a single MAC Domain at any given time. A MAC Domain provides layer 2 data transmission services between the CMTS Forwarders and the set of CMs registered to that MAC Domain. The MAC Domain classifies downstream packets into downstream "service flows" based on layer 2, 3, and 4 information in the packets. The MAC Domain schedules the packets for each downstream service flow to be transmitted on its set of downstream channels. In the upstream direction, the MAC Domain indicates to a CMTS Forwarder component when a Layer 2 packet has been received from a particular CM. Each CMTS Forwarder component is responsible for forwarding and replicating (if necessary) Layer 2 packets between the MAC Domains and the NSI port(s) of a CMTS. All upstream DOCSIS Layer 2 packets are delivered to a CMTS Forwarder subcomponent; the MAC Domain does not directly forward Layer 2 packets from upstream to downstream channels. Since the CMTS Forwarder is responsible for building the Layer 2 Ethernet header of downstream Data PDU packets, the IPv4 ARP and IPv6 ND protocols are considered to be implemented within the CMTS Forwarder.

The immediately following definitions are provided for example features of example embodiments relating to 10-gigabit PONs (XGPONs) as provided in ITU-T G987 XG-PON Systems: Definitions, Abbreviations and Acronyms (June 2012); G987.1 XG-PON General Requirements (March 2016) recommendations; and G987.3 Transmission Convergence Layer Specification (January 2014); which are fully incorporated herein by their reference:

Optical distribution network (ODN): A point-to-multipoint optical fiber infrastructure. A simple ODN is entirely passive and is represented by a single-rooted point-to-multipoint tree of optical fibers with splitters, combiners, filters, and possibly other passive optical components. A composite ODN consists of two or more passive segments interconnected by active devices, each of the segments being either an optical trunk line segment or an optical distribution segment. A passive optical distribution segment is a simple ODN itself.

Optical line termination (OLT): A network element in an ODN-based optical access network that terminates the root of at least one ODN and provides an optical access network (OAN) service node interface (SNI).

Optical network terminal (ONT): An ONU supporting a single subscriber

Optical network unit (ONU): A network element in an ODN-based optical access network that terminates a leaf of the ODN and provides an optical access network (OAN) user network interface (UNI).

ONU management and control interface (OMCI): An operation and management channel between the OLT and an ONU that is message-based and employs an extendable management information base (MIB).

ONU-ID: an identifier that addresses a particular ONU. During the ranging protocol, the ONU is assigned a number, from 0-1020, by the OLT.

Passive optical network (PON) system: A combination of network elements in an ODN-based optical access network that includes an OLT and multiple ONUs and implements a particular coordinated suite of physical medium dependent layer, transmission convergence layer, and management protocols.

Physical layer operation and management (OAM) or (PLOAM): A message-based operation and management channel between the OLT and the ONUs that supports the PON TC-layer management functions, including ONU activation, OMCC establishment, encryption configuration, key management and alarm signaling.

XG-PON encapsulation method (XGEM): A data frame transport scheme used in XG-PON systems that is connection-oriented and that supports fragmentation of the user data frames into variable-sized transmission fragments.

XGEM port: An abstraction on the GTC adaptation sublayer representing a logical connection associated with a specific client packet flow.

XGEM port identifier: or GEM Port-ID, is a 16-bit number that is assigned by the OLT to the individual logical connections.

XGTC framing sublayer: A sublayer of the XGPON transmission convergence layer that supports the functions of XGTC frame/burst encapsulation and delineation, embedded OAM processing, and Alloc-ID filtering.

XGTC PHY adaptation sublayer: A sublayer of the XG-PON transmission convergence layer that supports the functions of physical synchronization and delineation, forward error correction (FEC), and scrambling.

XGTC service adaptation sublayer: A sublayer of the XGPON transmission convergence layer that supports the functions of service data unit (SDU) including (user data and OMCI traffic) fragmentation and reassembly, XGEM encapsulation, XGEM frame delineation, and XGEM Port-ID filtering.

XGEM frame: a protocol data unit (PDU) of the XGTC framing sublayer that consists of an 8-byte GEM header and a variable-length GEM payload.

Dynamic bandwidth assignment (DBA): A process by which the OLT distributes upstream PON capacity between the traffic-bearing entities within ONUs, based on dynamic indication of their traffic activity and their configured traffic contracts.

Status reporting DBA (SR-DBA): A method of dynamic bandwidth assignment that infers the dynamic activity status of the traffic-bearing entities within ONUs based on explicit buffer occupancy reports communicated over the embedded OAM channel.

Physical Medium Dependent (PMD) (protocol layer): Defines the physical layer for optical transmissions in an optical access network (OAN), for downstream (from OLT to ONU(s)) and upstream (from ONU(s) to the OLT) directions.

Ranging: A procedure of measuring the logical distance between the OLT and any of its subtending ONUs with the objective to determine and assign the appropriate equalization delay, which is necessary to align the ONU's upstream transmissions on a common OLT-based upstream frame reference. Ranging is performed during ONU activation and may be performed while the ONU is in service.

XG-PON transmission convergence (XGTC) layer: A protocol layer of the XG-PON protocol suite that is positioned between the physical media dependent (PMD) layer and the XG-PON clients. The XGTC layer is composed of 3 sublayers, the XGTC service adaptation sublayer, the XGTC framing sublayer, and the XGTC PHY adaptation sublayer.

Allocation identifier (Alloc-ID): is a 14 bit number that the OLT assigns to an ONU to identify a traffic-bearing entity that is a recipient of upstream bandwidth allocations within that ONU. In embodiments of the present invention, the allocation identifier and GEM Port ID of an ONU are assigned as an ONUs ID and used by DOCSIS control as a DOCSIS MAC address for DOCSIS MAC control of the XGPON.

Figure 1:
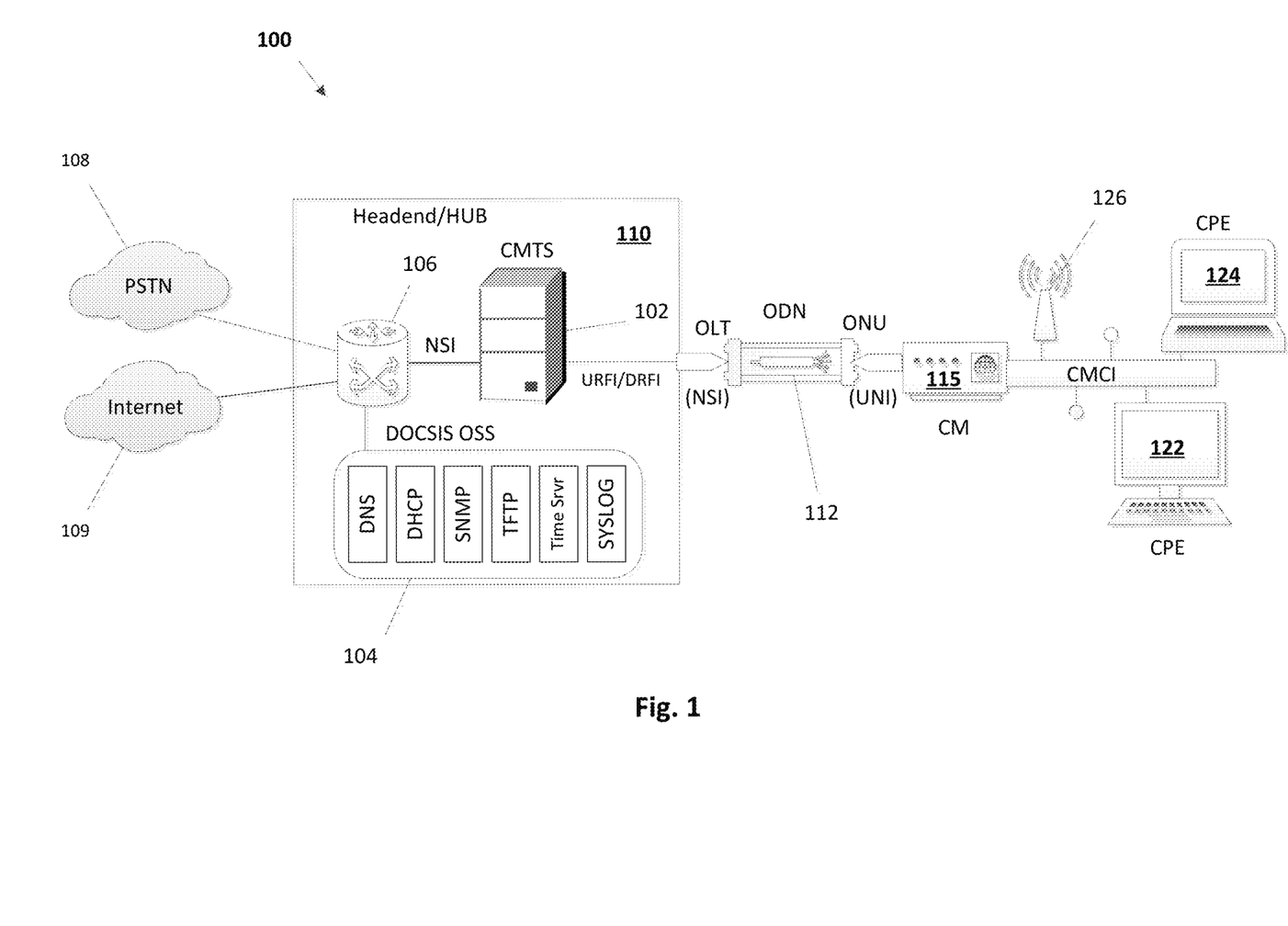
FIG. 1 shows a basic network diagram for one or more embodiments of the invention.

According to certain embodiments, referring to FIG. 1, a telecommunications network 100 is shown which provides broadband Internet access and/or other forms of packet based communications network access, to subscribers via a point-to-multipoint passive optical network (PON). In an example embodiment, network 100 may be a data over cable service interface specification (DOCSIS) cable network providing subscriber access to Internet 109 and, if desired, other service access, such as public switched telephone network 108, using a cable modem termination system (CMTS) 102 and subscriber DOCSIS cable modems 115 (only 1 is shown for simplicity) over a 10 Gb passive optical network (XGPON) 112. XGPON, by virtue of being a passive optical network, will include and optical line terminal (OLT), and optical distribution network (ODN) and a plurality of optical network units (ONUs) although in FIG. 1 only a single end point is shown.

In this example, a network provider HUB or headend 110 including the DOCSIS Cable Modem Termination System (CMTS) 102 is communicatively coupled to IP network 109 and PSTN 108, via router or switch 106, at its network service interface (NSI) and communicatively coupled to XGPON 112 at the CMTS upstream/downstream RF interface.

Headend 110 may include the relevant server(s), or port access to server(s) providing the operations support system (OSS) interfaces 104 supporting CMTS 102. Operations Support Systems Interfaces 104 are the network element management layer interfaces between the network elements and the high-level OSSs which support the basic business processes required for CMTS operation. For example, OSS DNS, DHCP, SMTP, system logging, timing server and TFTP.

As shown in network 100, embodiments of the present invention propose a combination of an XGPON system with a DOCSIS system in a design to enable highest reuse of existing equipment and software from both sides, as compared to DPoE in previous EPONs. In the various embodiments of the present invention, the DOCSIS CMTS 102 may efficiently provide a plurality of cable modem (CM) 115 subscribers fast and high bandwidth Internet over the ODN of XGPON 112, by signaling the XGPON to alter its control to use DOCSIS as the management layer of XGPON 112, either exclusively for DOCSIS modems 115 or coexisting with other XGPON standard(s) managing different optical network units (ONUs) supporting other end user applications, enables a much less burdensome deployment of new PONs.

By way of one example embodiment, a DOCSIS compliant cable network transceiver, e.g., DOCSIS CMTS 102, or possibly CM 115, signals a corresponding connected transceiver e.g., the OLT or one of the ONUs, in the XGPON 112, in a manner that the DOCSIS cable network takes control of the optical network upper management level processes, leaving XGPON in control of PHY layer protocols. In certain embodiments, other than initialization procedures, the XGPON is limited to layer 1 protocols including the physical medium dependent sublayer (PMD) and the transmission convergence (TC) sublayers. DOCSIS controls layer 2 and higher protocols, i.e., from lower data link layer 2—media access control (MAC) sublayer and higher, DOCSIS will manage IP data flows through the optical network above the boundaries of the XGPON TC layer. In this fashion, a simple division between the DOCSIS MAC layer and the XGPON PHY layers will manage data flows through the XGPON, rather than trying to split management tasks between both standards protocols as previously attempted with DPoE DOCSIS/EPON management attempts.

Figure 2:
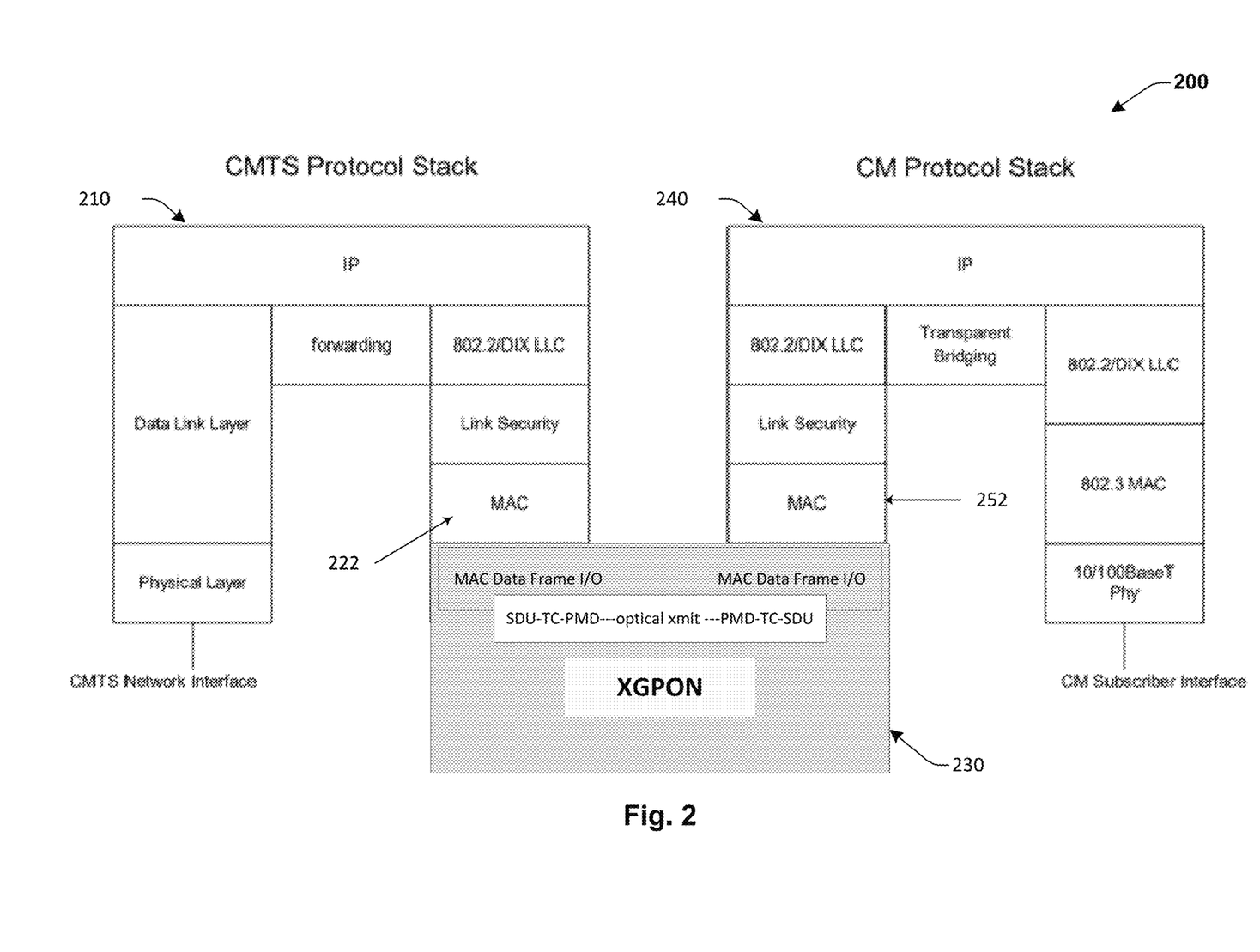
FIG. 2 shows an illustrative example division of respective protocol stack layers integrating an XGPON in a DOCSIS cable network between a DOCSIS CMTS and DOCSIS cable modems (CMs) according to various embodiments of the invention.

This division is illustrated conceptually in FIG. 2 which shows an example of a combined DOCSIS/XGPON protocol layer stack 200. As shown, IP traffic flows between DOCSIS CMTS 210 and DOCSIS cable modem 240 are transported across XGPON 230, effecting XGPON 240 as a physical layer transport medium for DOCSIS MAC data frames, according to various embodiments of the present invention. When modified per certain embodiments, the XGPON 230 is limited to Layer 1 (physical layer) protocols which include the three TC sublayers and the PMD sublayer, and DOCSIS media access control (MAC) layers 222, 252 of CMTS 210 and CM 240, respectively. The MAC data frames from CMTS 210 or CM 240 enter/exit the XGPON OLT via its Network Service Interface (NSI) or ONUs via its User Service Interface (USI). With certain embodiments of the present invention, these interfaces on the XGPON are called service data unit (SDU) interfaces, and accept any data structure input, to be output, unchanged, at an opposite end of the ODN under DOCSIS managed control.

Figure 3:
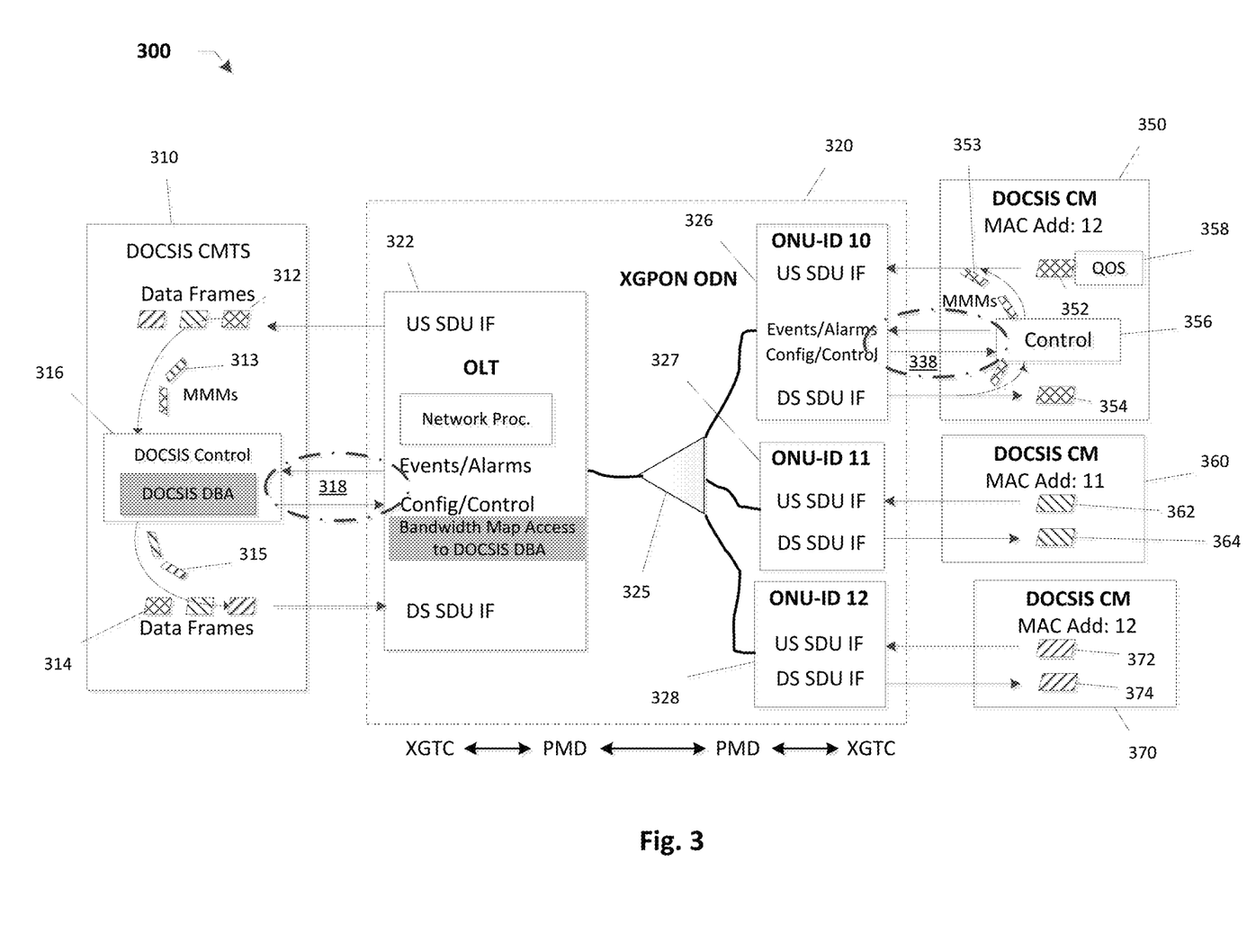
FIG. 3 shows a functional block diagram illustrating an example point-to-multipoint network architecture of a DOCSIS cable network and XGPON integration according to various aspects of the invention.

A detailed example block diagram of an example embodiment of a DOCSIS-XGPON network 300, will now be described in reference to FIG. 3. Similar to FIG. 1, Network 300 includes a DOCSIS CMTS 310 in communication with DOCSIS cable modems (CMs) 350, 360 and 370 through a 10 Gb Passive Optical Network (XGPON) 320.

XGPON 320 includes an optical line termination (OLT) 322 unit having upstream and downstream SDU interfaces with CMTS 310 to transfer upstream and downstream DOCSIS MAC data frames 312, 314, as well as DOCSIS MAC management messages (MMMs) 313, 315, between OLT 322 and CMTS 310.

Depending on upstream or downstream direction, DOCSIS data frames and MMMs entering XGPON 320 via SDU interfaces to an ingress XGPON node (e.g., OLT 322 or ONUs 326-328), are encapsulated and processed through the ingress XGPON node's TC and PMD sublayers according to the ITU-G.987.3 standard, and sent across the XGPON via the optical distribution network (ODN) to an egress XGPON node attached to DOCSIS nodes intended to receive the DOCSIS data frames or MMMs (e.g., upstream: CMTS 310 via OLT; or downstream: CMs 550, 560, 570 via the corresponding ONUs they are attached to). Upon arriving at the egress XGPON node(s), the PHY sublayer processing is applied in reverse order, and SDUs extracted as the same plain data, i.e., the DOCSIS MAC data frames or MMMs are unpacked, exactly as they entered XGPON 320, and transferred by the egress XGPON node, as an "SDU" flow via its SDU interface with the destination DOCSIS node. Note: in the downstream, different segments of optically transmitted frames in will likely have multiple DOCSIS data/MMMs destined for multiple CMs, and therefore multiple egress ONUs, as explained in further detail below.

As an example, in the upstream, data originating from CMs 550, 560 or 570, only one destination over the ODN, and hence, one egress XGPON node which is the OLT/CMTS. In this case, the ingress ONUs transmit bursts over the optical network according to assigned time frames allocated by an upstream bandwidth map.

On the other hand, when originated by CMTS 310, and the ingress XGPON node is the OLT 322 transmitting downstream to ONUs 326-328, the destination of MAC data and MMMs is enabled through DOCSIS management of the XGPON higher layers, which designates data destinations/egress optical nodes by virtue of MAC addresses placed in headers during TC sublayer processing. These MAC addresses having been previously assigned by DOCSIS to each XGPON optical node, as explained in more detail following.

In an example upstream flow, DOCSIS data frames 312 and/or MMMs 313 on SDU interface between OLT 322 and CMTS 310 and sent by any of DOCSIS CMs 350, 360 and 370, will be extracted from payloads of XGPON encapsulation method (XGEM) frames at the transmission convergence (XGTC) service adaptation sublayer. Those XGEM frames were previously extracted from payloads of XGPON transmission convergence (XGTC) frames at the XGTC framing sublayer, which in turn came from extracting the payload of a PHY frame received from upstream fiber transmissions the XGTC adaptation sublayer.

In example of the downstream direction of DOCSIS-XGPON network 300, downstream DOCSIS data frames 314 and MMMs 315 from CMTS 310 and destined for one or more of CMs 350, 360, 370, are received over the DS SDU interface to OLT 322 of XGPON 320. Next, the three XGTC sublayer processes (service adaption, framing and PHY adaption) are applied to the downstream data frames and/or MAC management messages, i.e., encapsulating as payload(s) of XGEM frame(s), then encapsulating as a payload of XGTC frame(s), then transformed into segmented bit stream(s). The segmented bit stream is modulated by the physical medium dependent (PMD) sublayer onto the optical medium and transmitted across the XGPON ODN, via splitter(s) 325, and received at ONUs 326, 327, 328 which are attached to the destination DOCSIS CMs 350, 360, 370. At each ONU, reverse PMD and TC sublayer processing are performed and SDUs with headers addressed to respective ONUs, causes each ONU to extract relevant SDU, i.e., the MAC data frame, which are transferred to the intended CM via the corresponding downstream SDU interface to the DOCSIS cable modem.

In order to limit XGPON 320 to the use of TC and PMD lower layers, a DOCSIS controller 316 or 356 must limit control, disable or allow the XGPON to perform functions in certain manner to the point where XGPON will not require higher management layers. For example, the XGPON should be allowed to provide the following functions on its own: ONU registration, ONU-ID assignment, Ranging, and PHY layer management including event/alarm generation. In certain embodiments, the DOCSIS control 316 obtains the assigned ONU-IDs and uses them as DOCSIS MAC addresses for addressing data frames and MAC Management Messages, e.g., 312, 315, 352, 354, 362, 364, 372, 374, 313, 315, 353 to specific egress optical nodes. The DOCSIS controller 316 or 356 also configures the XGPON in a way to keep all media access control (MAC) functionality managed and controlled by the DOCSIS.

Figure 5:
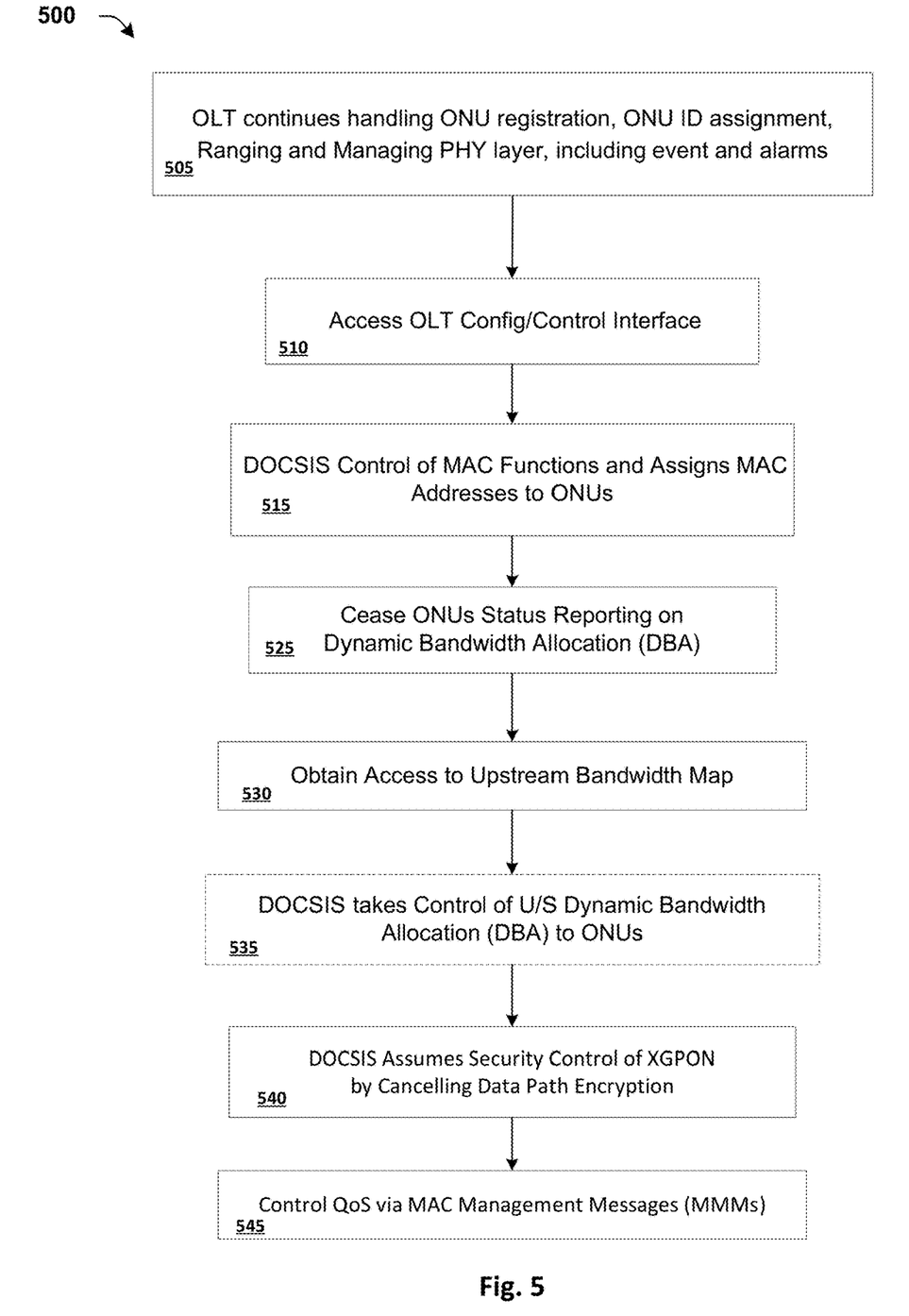
FIG. 5 shows a flow diagram detailing a method of communicating DOCSIS cable network data in an XGPON according to various embodiments of the invention.

In certain example embodiments, the separation of management capabilities between XGPON and DOCSIS can be readily accomplished with slight modification to normal XGPON configurations as explained in more detail referencing FIG. 5. Through DOCSIS controller and interface 316, 318 to the XGPON configuration and control functions and events/alarms logs, DOCSIS can access/modify/control the upstream bandwidth map in OLT 322 and enables DOCSIS to disable certain optional XGPON features such as ONU reporting upstream bandwidth status/traffic and dynamic bandwidth allocation, data-path encryption, QoS functionality and the like.

Through DOCSIS control and interface 338, 356, the underlying XGPON is configured to behave as DOCSIS network using XGPON physical layer (layer 1) protocols. Another advantage is that the DOCSIS MAC Management Messages (MMMs) are part of the service data unit (SDU) flow generated/interpreted on a DOCSIS level which may be used to manage priority of data flows and thus Quality of Service (QoS) and traffic management governed by the DOCSIS MAC instead of the XGPON MAC.

Figure 4:
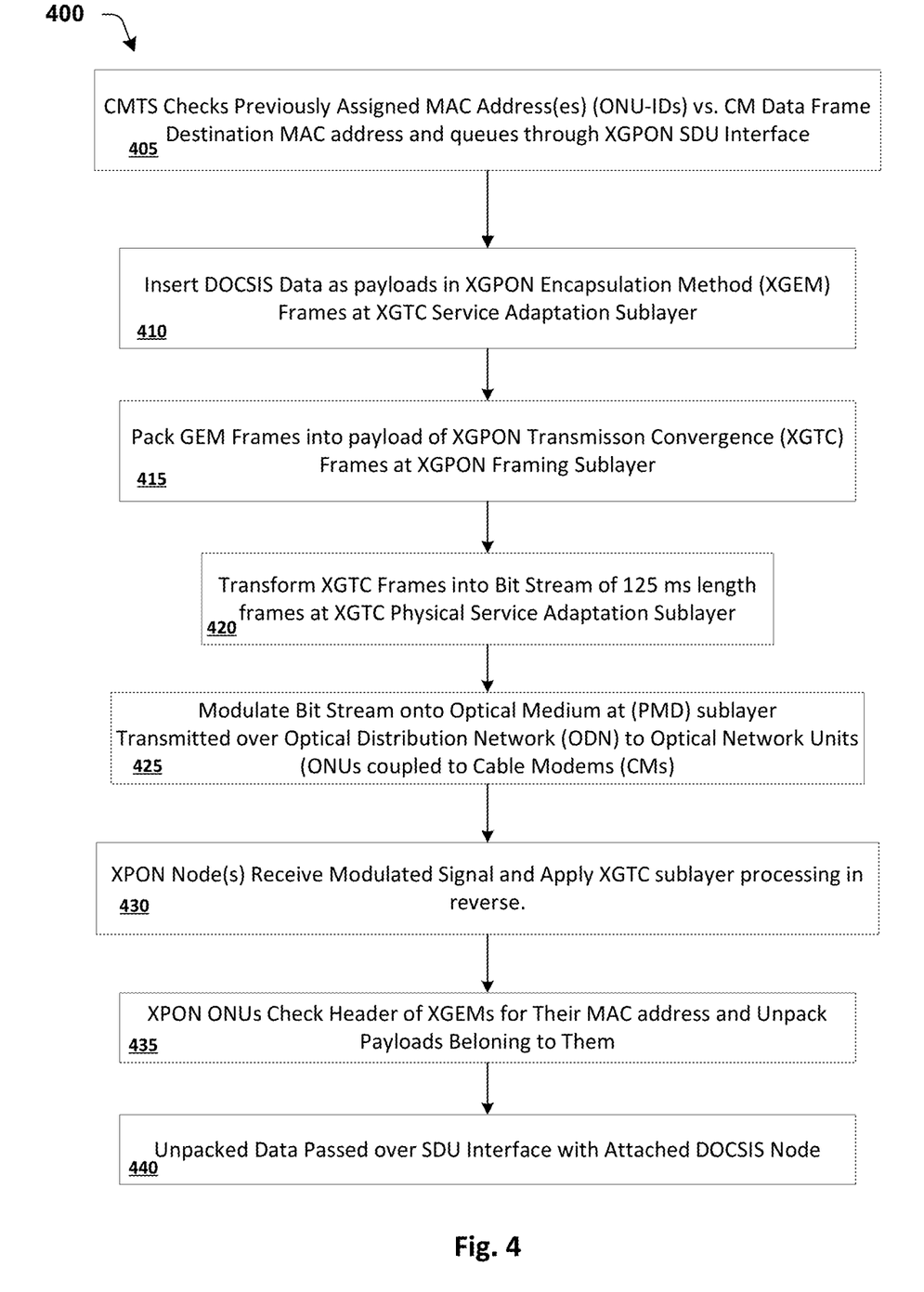
FIG. 4 shows a flow diagram for a method of configuring an XGPON for communicating in a DOCSIS cable modem network according to certain inventive embodiments.

Referring to FIG. 4, an example embodiment for a method 400 of DOCSIS data transmission through a DOCSIS-managed XGPON is described. Method 400 begins in the downstream direction (i.e., from CMTS to a designated CM) in which the CMTS, based on its access/control of the OLT bandwidth map and ONU-IDs, identifies 405 the MAC address assigned previously to the ONU that is servicing the cable modem destination MAC address to which particular DOCSIS data frame(s)/MMM(s) (referred to collectively as DOCSIS or CM data) are intended. In the upstream, this step is not required as all traffic from CMs through the XGPON go to the OLT and further to the CMTS. The DOCSIS data may be provided through the SDU data XGPON interface according to a QoS queue (if applicable).

The SDU traffic is included 410 as payloads dedicated for a particular DOCSIS node, and to which headers are added forming protocol data units (PDU) as XGPON encapsulation method (XGEM) frames. SDUs may be fragmented as necessary between XGEM payloads and each payload filled with DOCSIS data destined for a particular DOCSIS node, e.g., DOCSIS MAC data frames. In certain embodiments, the XGEM headers include the DOCSIS assigned ONU-ID based MAC address and other potentially needed control fields at the XGPON Layer 1 TC service adaptation sublayer. Next, several GEM frames are packed 415 into a payload for the next XGTC sublayer, called the framing sublayer. A header having DOCSIS provided control plane information including the upstream bandwidth allocation map, is appended that payload to form XGPON transmission convergence (XGTC) frames.

At the third and final XGTC sublayer, the physical service adaptation sublayer, the XGTC frames are transformed 420 into a bit stream partitioned into 125 microsecond length frames which are passed to the Layer 1 physical medium dependent (PMD) sublayer and modulated on and transmitted 430 by the optical medium over the optical distribution network (ODN) to the ONUs (in the downstream direction) and the same XGTC sublayers are applied in reverse order at the receiving ONUs. When de-framed the XGEM headers are checked 435 by the ONUs, each ONU identifying which XGEM data payloads to extract based on the ONU-based MAC address assigned by the CMTS and discarding all others. That is, each ONU finds 435 the one or more frames addressed to itself by checking the MAC address/Port-ID field in XGEM header. Correspondingly, related system management actions will be carried out at the ONU. Finally, the extracted DOCSIS data is passed over the interface with the cable modem attached to the ONU.

Accordingly, in general, in the downstream direction, every ONU will receive a whole frame that contains the messages for all included ONUs from the OLT side. An ONU will just unpack the part which belongs to itself according to its DOCSIS MAC address. In the upstream direction, all ONUs share a frame but in different time slots, which are allocated by the DOCSIS control of the OLT, in the bandwidth map in downstream messages. Bandwidth allocation for upstream is identified for each ONU based on its Alloc-ID which means time-slots are allocated by Alloc-ID in the upstream bandwidth map.

Turning to FIG. 5, a method 500 of altering the protocols in a 10 Gb passive optical network (XGPON) to serve as the physical layer for communications between a DOCSIS CMTS and a plurality of CMs in a cable network is described. Although a certain of these features have been mentioned previously in describing the network architecture of FIG. 3, method 500 details a direct approach for adapting a XGPON with a DOCSIS configuration to obtain advantages and features of the inventive embodiments. Accordingly, initially method 500 may include allowing 505 the XGPON optical line terminal (OLT) to continue performing its XGPON protocol tasks for optical network unit (ONU) registration including assigning ONU-IDs to active ONUs. The OLT also is allowed to continue performing ranging and other management functions of XGPON physical layer.

Next, the CMTS connects 510 to the XGPON config/control interface at the OLT and assumes 515 control from XGPON of media access control (MAC) functions, assigning MAC addresses to each optical network unit (ONU). In certain embodiments, the MAC addresses are based on the ONU IDs, which are the same as the allocation ID and GEM port ID, although there is no limitation to this particular format.

DOCSIS control stops 525 reporting by ONUs to the OLT for dynamic bandwidth allocation updates and taking over access 530 and, optionally, control 535 of the upstream bandwidth map. DOCSIS may also assume control 540 of XGPON security functions by XGPON disabling data path encryption and lastly, Quality of Service (QoS) is controlled 545 by DOCSIS through the use of DOCSIS MAC management messages (MMMs) sent thru ONU service data unit (SDU) interfaces.

The above modification of optional XGPON protocol features with control by DOCSIS protocols, maintain the compliance of the passive optical network with the XGPON standards previously mentioned, and can be implemented using existing hardware, and with only slight modifications to the OLT and ONUs by DOCSIS through external access to the optical node's config/control and events/alarms interfaces.

Figure 6:
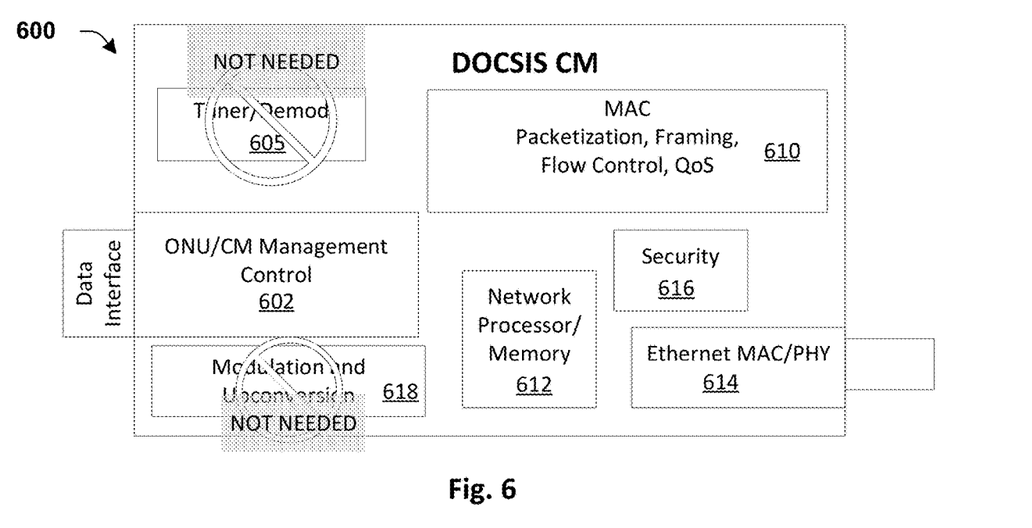
FIGS. 6 and 7 show respective block diagrams of a DOCSIS cable modem (CM) and a DOCSIS cable modem termination system (CMTS), adapted to control and communicate data through a 10 Gb passive optical network (XGPON)
Figure 7:
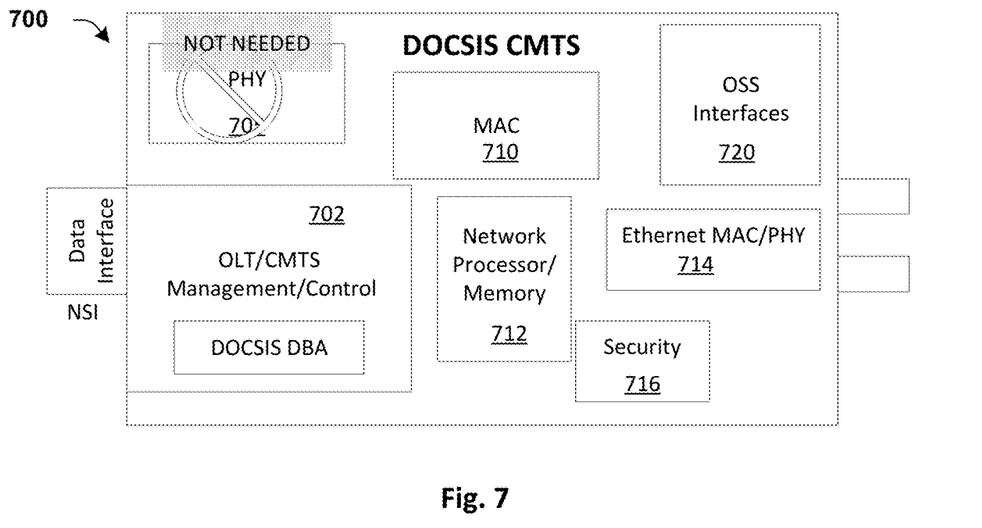

FIGS. 6 and 7 illustrate example block diagrams showing potential configurations for a DOCSIS cable modem (CM) 600 and a cable modem termination system (CMTS) 700 respectively. The features described above for operation may be performed by these devices which notably, illustrate PHY layer components such as layer 1 converters and modulators that are not necessary when using an XGPON as the physical layer and physical medium for data flows between CM 600 and CMNTS.

As shown in FIG. 6, a DOCSIS cable modem 600 for communications via an XGPON may include a controller 602 and I/O data interface adapted to couple with an XGPON SDU interface sending and receiving DOCSIS MAC data frames and MMMs, as well as to provide control/config signaling and event/alarm monitoring control of XGPON features as previously discussed. Controller may provide necessary processing from CMs network processor 612 and/or handle certain processes on its own in distributed fashion according to preferences of a system architect. FIG. 6 illustrates components of typical cable modem such as physical layer processing 605, 618 for signal up/down conversion as "not necessary" merely to point out their presence could be included, if desired, for interfacing to legacy networks not utilizing XGPON as a physical layer/medium.

In certain example embodiments, modem 600 may further include various other functional elements such as data link layer management circuit 610 for packetization, managing flow control and higher layer levels of the OSI communications model, a network processor/memory 612 adapted to control or provide processing/storage for various functional elements of modem 600 as desired as well as XGPON configuration and control processing. Furthermore, modem 600 may include security functionality 616 and client/user interface functionality 614, such as 10-100 Gb based Ethernet PHY/MAC processing and respective interface(s) to provide a user TCP/IP layer interface connectivity. It should be understood that modem 600 is only a representational functional example and various additional functionalities may be included as desired or those functionalities shown omitted if not needed or desired as known by one of ordinary skill in the art. Thus the specific example depicted and described is not intended to limit the embodiments of the invention in any manner.

An example CMTS 700 is similarly depicted with typical CMTS-related capabilities including MAC functionalities 710, network processor 712, security 716 and interface coupling/processing 714 for connections with a core network such as an Internet network, via a switch or router, etc. CMTS 700 may also include an XGPON controller 702 and I/O data interface for coupling to an OLT of the XGPON network via a MAC level SDU interface. In certain embodiments, XGPON controller may include dynamic bandwidth allocation (DBA) processing capabilities for managing access/control of an XGPON upstream bandwidth allocations to ONUs, although not required. This processing may alternatively be handled by network processor 712 with only control/monitoring interface signaling through controller 702, or all processing combined as a single network processor. CMTS may also include interfaces 720 with OSS servers as desired. It is noted that features are shown separately for understanding of capabilities and not as an architecture configuration. Moreover, many features/elements are not necessary shown for simplicity of illustration.

Those of skill in the art would recognize modifications and substitutions of the elements, components and circuits described herein and possible and the invention is not limited to the specific examples in the detailed description but rather by the appended claims.

In an Example 1, a network processor in a cable network communication device is disclosed and has a memory, a communication module and a network data interface coupled to the communication module, and adapted to connect to a node in a 10 Gb passive optical network (XGPON), wherein when said connector is connected to the XGPON node and said network processor is powered on and executing instructions stored in said memory. The network processor causes the network data interface to communicate with at least one other cable network communication device through said XGPON in accordance with an established cable network packet switched protocol, and controls one or more features of the XGPON such that both the communication module and the at least one other cable network device output and intake data information at no less than a layer 2 (data link layer) protocol for communication with each other.

In an Example 2 that depends on Example 1, the packet switched protocol comprises an Internet Protocol version six (IPv6).

In an Example 3 that depends on Example 1, the network data interface comprises a data over cable service interface specification (DOCSIS) medium access control (MAC) interface providing DOCSIS MAC data frames to said XGPON via an XGPON service data unit (SDU) interface.

In an Example 4 that depends on Example 1, the cable network communication device comprises a cable modem (CM).

In an Example 5 that depends on Example 3, the cable network communication device comprises a cable modem termination system (CMTS).

In an Example 6 that depends on Example 1, the cable network utilizes data over cable service interface specification (DOCSIS) protocols.

In an Example 7 that depends on Example 5, the node in said XGPON comprises an optical line terminal (OLT).

In an Example 8 that depends on Example 1, the node in said XGPON comprises an optical network unit (ONU).

In an Example 9 that depends on Example 7, the cable network comprises a data over cable service interface specification (DOCSIS) and the one or more features controlled in said XGPON include: interfacing with the OLT's config/control interface and replacing the OLT with DOCSIS control of the XGPON: (1) medium access control (MAC) functions and assigning MAC addresses to each optical network unit (ONU); (2) upstream dynamic bandwidth allocation (DBA) to ONUs by disabling ONU DBA reporting to the OLT and accessing of an upstream bandwidth map; (3) security functions by disabling data path encryption in said XGPON; and (4) quality of service (QoS) by distributing MAC management messages in the XGPON by way of OLT and ONU service data unit (SDU) interfaces.

In an Example 10 a 10 Gb passive optical network (XGPON) network processor is disclosed that has open system interconnection (OSI) layers above layer 1 (physical layer) disabled and is controlled by a data over cable service interface specification (DOCSIS) configuration which ignores optional features of XGPON protocols and uses XGPON service data units (SDUs) to pass DOCSIS data frames and medium access control (MAC) management messages (MMMs) between an optical line terminal (OLT) and a plurality of optical networking units (ONUs) in the XGPON network. The XGPON SDUs are processed by the XGPON physical layer protocols including three transmission convergence (TC) sublayers and a physical media dependent (PMD) sublayer.

In an Example 11 that depends on Example 10, the optional features ignored by the DOCSIS configuration includes upstream dynamic bandwidth allocation (DBA) reporting by ONUs, XGPON data path encryption and XGPON Quality of Service (QoS) abilities.

In an Example 12 that depends on Example 10, the MMMs control Quality of Service (QoS) for the DOCSIS data frames in SDU service flows through the XGPON.

In an Example 13 that depends on Example 10, the XGPON processor is configured to reside in and control OLT functions not disabled, including ONU registration, ONU-ID assignment, ranging and management of XGPON physical layer.

In an Example 14 that depends on Example 13, the DOCSIS configuration controlling XGPON functionality is a DOCSIS cable modem termination system (CMTS) interfaced with a config/control in the OLT and controlling access to an upstream bandwidth map in the OLT.

In an Example 15, a data over cable service interface specification (DOCSIS)-enabled communication device is disclosed, and comprises a communications processor, a memory coupled to the communications processor, the memory including a DOCSIS communications protocol stack without a layer 1 (physical layer) protocol, and a data interface including an external port configured to connect to a service data unit (SDU) interface of one of an optical line terminal (OLT) or an optical network unit (ONU) of a DOCSIS configured 10 Gb passive optical network (XGPON). The communication device is operative to communicate with one or more remote DOCSIS communication devices by exchanging layer 2 (data link layer) data frames over the XGPON.

In an Example 16 that depends upon an Example 15, the layer 2 data frames comprise Internet Protocol version 6 (IPv6) packets.

In an Example 17 that depends upon an Example 15, the XGPON is configured by DOCSIS to be limited to layer 1 native XGPON protocols and serves as a physical layer between the communication device and the one or more remote DOCSIS communication devices passing the DOCSIS layer 2 data frames as a service data unit (SDU) flow between an OLT SDU interface over an optical distribution network (ODN) and a plurality of ONUs SDU interfaces.

In an Example 18 a method of altering protocols in a passive optical network (XGPON) to serve as a physical layer and medium for communications between nodes in a data over cable service interface specification (DOCSIS) cable network is disclosed. The method comprises allowing an XGPON optical line terminal (OLT) to continue performing native tasks including: optical network unit (ONU) registration, ONU ID assignment, ranging and management of an XGPON physical layer, accessing a config/control interface OLT, and replacing the OLT control with DOCSIS control of the XGPON: (1) medium access control (MAC) functions and assigning MAC addresses to each optical network unit (ONU), (2) upstream dynamic bandwidth allocation (DBA) to ONUs by disabling ONU DBA reporting to the OLT and taking over access to an upstream bandwidth map, (3) security functions by disabling data path encryption in said XGPON, and (4) quality of service (QoS) by distributing MAC management messages in the XGPON by way of OLT and ONU service data unit (SDU) interfaces.

In an Example 19 that depends on Example 18, the MAC addresses are assigned based on ONU-IDs.

In an Example 20 that depends on Example 19, the altering protocols is performed by a cable network termination system (CNTS) connection with the OLT via an OLT control and configuration and events and alarms interface.

In an Example 21 that depends on any of Examples 1-6, the node in said XGPON comprises an optical line terminal (OLT).

In an Example 22 that depends on any of Examples 1-6, the node in said XGPON comprises an optical network unit (ONU).

In an Example 23 that depends on any of Examples 15-17, the communication device comprises a DOCSIS cable modem termination system (CMTS).

In an Example 24 that depends on any of Examples 15-17, the communication device comprises a DOCSIS cable modem (CM).

In an Example 25 that depends on Example 15, the communication device comprises a DOCSIS cable modem termination system (CMTS).

In an Example 26 that depends on Example 15, the communication device comprises a DOCSIS cable modem (CM).

In an Example 27, a network processor in a cable network communication device having a memory, a communication module and a network data interface coupled to the communication module, and adapted to connect to a node in a 10 Gb passive optical network (XGPON) is disclosed. The network processor is configured to cause the network data interface to communicate with at least one other cable network communication device through said XGPON in accordance with an established cable network packet switched protocol, and control one or more features of the XGPON such that both the communication module and the at least one other cable network device output and intake data information at no less than a layer 2 (data link layer) protocol for communication with each other.

In an Example 28 a device for altering protocols in a passive optical network (XGPON) to serve as a physical layer and medium for communications between nodes in a data over cable service interface specification (DOCSIS) cable network is disclosed. The device comprises means for allowing an XGPON optical line terminal (OLT) to continue performing native tasks including: optical network unit (ONU) registration, ONU ID assignment, ranging and management of an XGPON physical layer. The device also comprises means for accessing a config/control interface OLT, and means for replacing the OLT control with DOCSIS control of the XGPON: (1) medium access control (MAC) functions and assigning MAC addresses to each optical network unit (ONU), (2) upstream dynamic bandwidth allocation (DBA) to ONUs by disabling ONU DBA reporting to the OLT and taking over access to an upstream bandwidth map, (3) security functions by disabling data path encryption in said XGPON, and (4) quality of service (QoS) by distributing MAC management messages in the XGPON by way of OLT and ONU service data unit (SDU) interfaces.

In an Example 29 that depends on Example 28, the MAC addresses are assigned based on ONU-IDs.

In an Example 30 that depends on Example 28, the altering protocols is performed by a cable network termination system (CNTS) connection with the OLT via an OLT control and configuration and events and alarms interface.

In an Example 31 that depends on Example 27, the packet switched protocol comprises an Internet Protocol version six (IPv6).

In an Example 32 that depends on Examples 27 or 31, the network data interface comprises a data over cable service interface specification (DOCSIS) medium access control (MAC) interface providing DOCSIS MAC data frames to said XGPON via an XGPON service data unit (SDU) interface.

In an Example 33 that depends on any of Examples 27 or 31-32, the cable network communication device comprises a cable modem (CM).

In an Example 34 that depends on any of Examples 27 or 31-33, the cable network communication device comprises a cable modem termination system (CMTS).

In an Example 35 that depends on any of Examples 27 or 31-34, the cable network utilizes data over cable service interface specification (DOCSIS) protocols.

In an Example 36 that depends on any of Examples 27 or 31-35, the node in said XGPON comprises an optical line terminal (OLT).

In an Example 37 that depends on any of Examples 27 or 31-36, the node in said XGPON comprises an optical network unit (ONU).

In an Example 38 that depends on Example 36, the cable network comprises a data over cable service interface specification (DOCSIS) and the one or more features controlled in said XGPON include: interfacing with the OLT's config/control interface and replacing the OLT with DOCSIS control of the XGPON: (1) medium access control (MAC) functions and assigning MAC addresses to each optical network unit (ONU), (2) upstream dynamic bandwidth allocation (DBA) to ONUs by disabling ONU DBA reporting to the OLT and accessing of an upstream bandwidth map, (3) security functions by disabling data path encryption in said XGPON, and (4) quality of service (QoS) by distributing MAC management messages in the XGPON by way of OLT and ONU service data unit (SDU) interfaces.

In an Example 39 that depends on Examples 20 or 21, the altering protocols is performed by a cable network termination system (CNTS) connection with the OLT via an OLT control and configuration and events and alarms interface.

Disclaimer: The present disclosure has been described with reference to the attached drawing figures, with certain example terms and wherein like reference numerals are used to refer to like elements throughout. The illustrated structures, devices and methods are not intended to be drawn to scale, or as any specific circuit or any in any way other than as functional block diagrams to illustrate certain features, advantages and enabling disclosure of the inventive embodiments and their illustration and description is not intended to be limiting in any manner in respect to the appended claims that follow, with the exception of 35 USC 112, sixth paragraph claims using the literal words "means for," if present in a claim.

As utilized herein, the terms "component," "system," "interface," "logic," "circuit," "device," and the like are intended only to refer to a basic functional entity such as hardware, software (e.g., in execution), logic (circuits or programmable), firmware alone or in combination to suit the claimed functionalities. For example, a component, module, device or processing unit may mean a microprocessor, a controller, a programmable logic array and/or a circuit coupled thereto or other logic processing device, and a method or process may mean instructions running on a processor, firmware programmed in a controller, an object, an executable, a program, a storage device including instructions to be executed, a computer, a tablet PC and/or a mobile phone with a processing device.

By way of illustration, a process, logic, method or module can be any analog circuit, digital processing circuit or combination thereof. One or more circuits or modules can reside within a process, and a module can be localized as a physical circuit, a programmable array, a processor. Furthermore, elements, circuits, components, modules and processes/methods may be hardware or software, combined with a processor, executable from various computer readable storage media having executable instructions and/or data stored thereon. Those of ordinary skill in the art will recognize various ways to implement the logical descriptions of the appended claims and their interpretation should not be limited to any example or enabling description, depiction or layout described above, in the abstract or in the drawing figures.

The invention claimed is:

1. A network processor in a cable network communication device having a memory, a communication module and a network data interface coupled to the communication module, and adapted to connect to a node in a 10 Gb passive optical network (XGPON), the network processor configured to:
    cause the network data interface to communicate with at least one other cable network communication device through said XGPON in accordance with an established cable network packet switched protocol; and
    control one or more features of the XGPON via a first layer, wherein the cable network communication device is to operate via one or more other layers, wherein the network processor is configured to control one or more optical line terminal (OLT) functions including at least one of: ONU registration, ONU-ID assignment, ranging and management of XGPON physical layer.

2. The network processor of claim 1 wherein the packet switched protocol comprises an Internet Protocol version six (IPv6).

3. The network processor of claim 1 wherein the network data interface comprises a data over cable service interface specification (DOCSIS) medium access control (MAC) interface providing DOCSIS MAC data frames to said XGPON via an XGPON service data unit (SDU) interface.

4. The network processor of claim 1 wherein the cable network communication device comprises a cable modem (CM).

5. The network processor of claim 1 wherein the cable network communication device comprises a cable modem termination system (CMTS).

6. The network processor of claim 5 wherein said node in said XGPON comprises an optical line terminal (OLT).

7. The network processor of claim 6 wherein the cable network communication device comprises a data over cable service interface specification (DOCSIS) and wherein the one or more features controlled in said XGPON include: interfacing with the OLT's config/control interface and replacing the OLT with DOCSIS control of the XGPON: (1) medium access control (MAC) functions and assigning MAC addresses to each optical network unit (ONU); (2) upstream dynamic bandwidth allocation (DBA) to ONUs by disabling ONU DBA reporting to the OLT and accessing of an upstream bandwidth map; (3) security functions by disabling data path encryption in said XGPON; and (4) quality of service (QoS) by distributing MAC management messages in the XGPON by way of OLT and ONU service data unit (SDU) interfaces.

8. The network processor of 1 wherein the cable network communication device utilizes data over cable service interface specification (DOCSIS) protocols.

9. The network processor of claim 1 wherein said node in said XGPON comprises an optical network unit (ONU).

10. A 10 Gb passive optical network (XGPON) network processor having open system interconnection (OSI) layers above layer 1 (physical layer) disabled from the perspective of the XGPON network processor, the OSI layers above layer 1 being controlled by a data over cable service interface specification (DOCSIS) configuration which ignores optional features of XGPON protocols and uses XGPON service data units (SDUs) to pass DOCSIS data frames and medium access control (MAC) management messages (MMMs) between an optical line terminal (OLT) and a plurality of optical networking units (ONUs) in the XGPON network, wherein the XGPON SDUs are processed by the XGPON physical layer protocols including three transmission convergence (TC) sublayers and a physical media dependent (PMD) sublayer, the XGPON network processor residing at the OLT, wherein the XGPON processor is configured to control OLT functions not disabled, including at least one of: ONU registration, ONU-ID assignment, ranging and management of XGPON physical layer.

11. The XGPON network processor of claim 10 wherein said optional features ignored by the DOCSIS configuration includes upstream dynamic bandwidth allocation (DBA) reporting by ONUs, XGPON data path encryption and XGPON Quality of Service (QoS) abilities.

12. The XGPON network processor of claim 10 wherein the MMMs control Quality of Service (QoS) for the DOCSIS data frames in SDU service flows through the XGPON.

13. The XGPON network processor of claim 10, wherein the DOCSIS configuration controlling XGPON functionality is a DOCSIS cable modem termination system (CMTS) interfaced with a config/control in the OLT and controlling access to an upstream bandwidth map in the OLT.

14. A data over cable service interface specification (DOCSIS)-enabled communication device comprising:
  a communications processor;
  a memory coupled to the communications processor, the memory including a DOCSIS communications protocol stack without having access to a layer 1 (physical layer) protocol; and
  a data interface including an external port configured to connect to a service data unit (SDU) interface of one of an optical line terminal (OLT) or an optical network unit (ONU) of a DOCSIS configured 10 Gb passive optical network (XGPON), the XGPON having access to the layer 1 and not to other layers in the DOCSIS communications protocol stack;
  wherein the communication device is operative to communicate with one or more remote DOCSIS communication devices by exchanging layer 2 (data link layer) data frames over the XGPON,
  wherein the XGPON is configured to control OLT functions not disabled, including at least one of: ONU registration, ONU-ID assignment, ranging and management of XGPON physical layer.

15. The communication device of claim 14 wherein the communication device comprises a DOCSIS cable modem termination system (CMTS).

16. The communication device of claim 14 wherein the communication device comprises a DOCSIS cable modem (CM).

17. The communication device of claim 14 wherein the layer 2 data frames comprise Internet Protocol version 6 (IPv6) packets.

18. The communication device of claim 14 wherein the XGPON is configured by DOCSIS to be limited to layer 1 native XGPON protocols and serves as a physical layer between the communication device and the one or more remote DOCSIS communication devices passing the DOCSIS layer 2 data frames as a service data unit (SDU) flow between an OLT SDU interface over an optical distribution network (ODN) and a plurality of ONUs SDU interfaces.

19. A method of altering protocols in a passive optical network (XGPON) to serve as a physical layer and medium for communications between nodes in a data over cable service interface specification (DOCSIS) cable network, the method comprising:
  allowing an XGPON optical line terminal (OLT) to continue performing native tasks including: optical network unit (ONU) registration, ONU ID assignment, ranging and management of an XGPON physical layer;
  accessing a config/control interface OLT; and
  replacing the OLT control with DOCSIS control of the XGPON:
    (1) medium access control (MAC) functions and assigning MAC addresses to each optical network unit (ONU);
    (2) upstream dynamic bandwidth allocation (DBA) to ONUs by disabling ONU DBA reporting to the OLT and taking over access to an upstream bandwidth map;
    (3) security functions by disabling data path encryption in said XGPON; and
    (4) quality of service (QoS) by distributing MAC management messages in the XGPON by way of OLT and ONU service data unit (SDU) interfaces.

20. The method of claim 19 wherein the MAC addresses are assigned based on ONU-IDs.

21. The method of claim 19 wherein altering protocols is performed by a cable network termination system (CNTS) connection with the OLT via an OLT control and configuration and events and alarms interface.

* * * * *